Oct. 3, 1939.   A. S. VAN HALTEREN   2,175,044
VEHICLE WHEEL
Original Filed April 18, 1935   2 Sheets-Sheet 1

Inventor
Andrew S. Van Halteren
By Albert L. Ely
Attorney

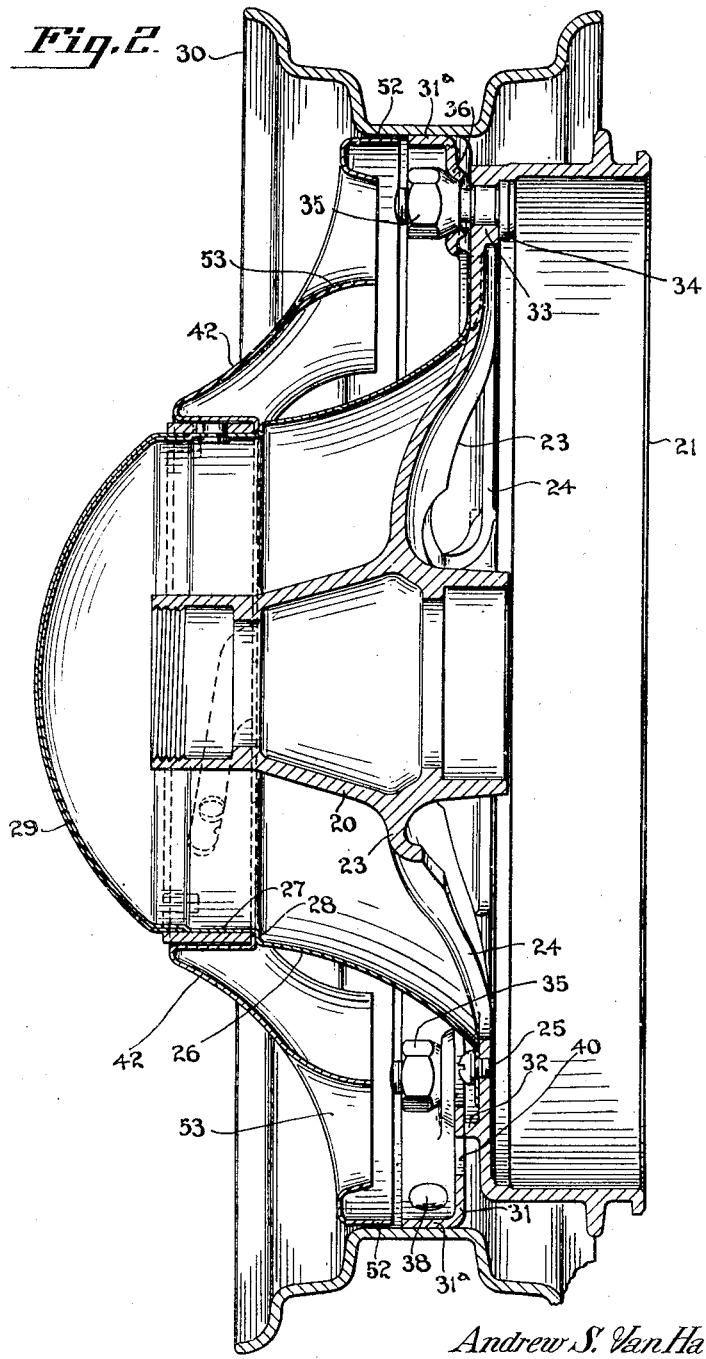

Patented Oct. 3, 1939

2,175,044

UNITED STATES PATENT OFFICE 2,175,044

VEHICLE WHEEL

Andrew S. Van Halteren, East Lansing, Mich., assignor, by mesne assignments, to The Firestone Tire & Rubber Company, Akron, Ohio, a corporation of Ohio Original application April 18, 1935, Serial No. 17,020. Divided and this application May 10, 1937, Serial No. 141,626

2 Claims. (Cl. 301—6)

This invention relates to vehicle wheels, and more especially it relates to brake drums for automobile wheels carrying removable tire supporting rims.

The widespread use of low-pressure pneumatic tires with corresponding decrease in the diameter of tire rims, and the increased speed of automobiles which has required the use of larger brake drums, has resulted in the common practice of mounting the tire rims directly upon the brake drums. The construction mentioned has not heretofore been without some unsatisfactory features. When the rim had complete circumferential connection with the brake drum, frictional heat from the latter was conducted to the rim with resultant damage to tire and tube, and difficulty was encountered in providing circulation of air about the brake drum to cool the same. When the rim was connected to the brake drum locally by means of attached clamps or lugs at spaced points circumferentially thereof, jars and jolts to the tire and rim were translated to corresponding local regions of the brake drum with the result that the latter became distorted and out of round and subject to unequal wear and impaired efficiency.

The chief objects of this invention are to provide an improved vehicle wheel of the character mentioned wherein heat transfer from brake drum to tire rim largely is avoided; and wherein forces applied locally to the tire and rim are transmitted through an annular drive ring with angular cross-section, to the brake drum, and translated to a relatively large area of the latter. A further object is to provide a construction which enables the circulation of air to and about the brake drum. Other objects will be manifest.

This application is a division of my co-pending application Serial No. 17,020 filed April 18, 1935 now Patent No. 2,130,207.

Of the accompanying drawings:

Figure 2 is a section on the line 2—2 of Figure 1;

Figure 1:
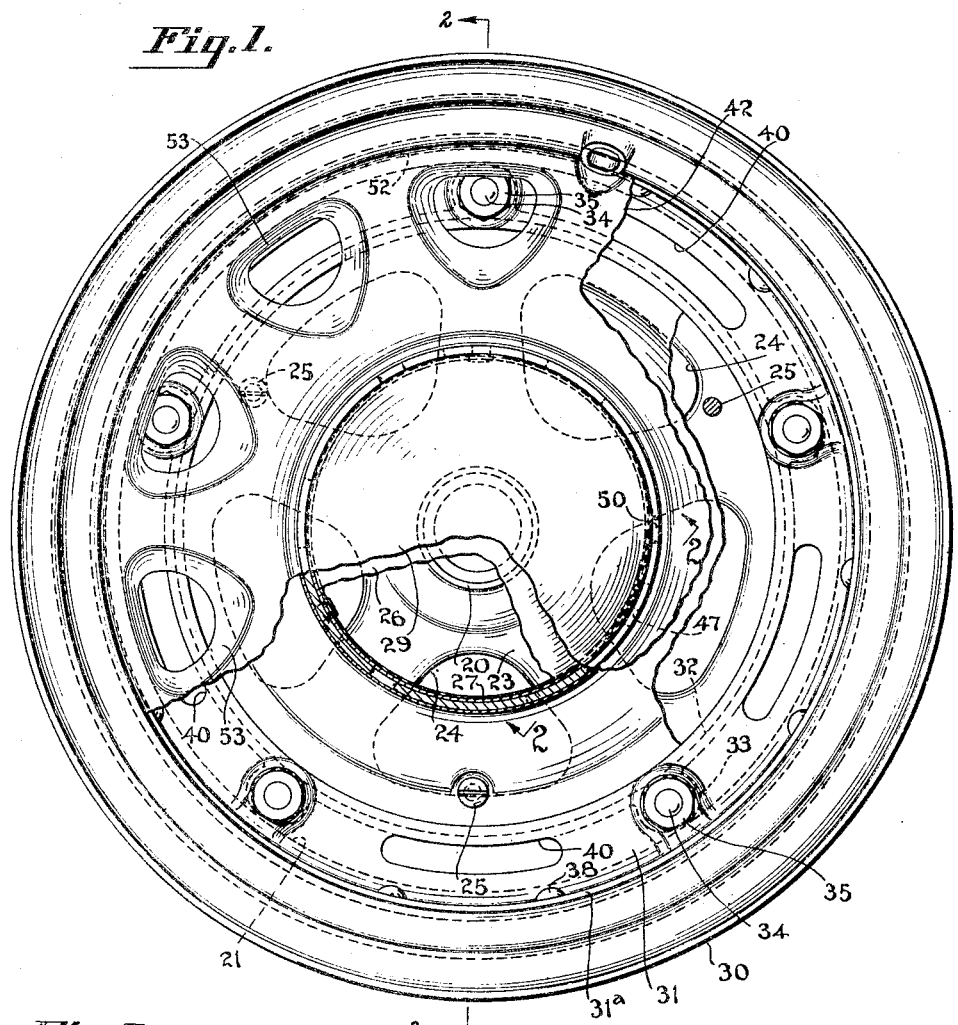
Figure 1 is a front elevation of a vehicle wheel embodying the invention, in its preferred form, parts being broken away and in section for clearness of illustration.

Referring now to the drawings, there is shown a vehicle wheel comprising a hub 20 and a brake drum 21 which constitute a unitary structure through the agency of an intervening web 23, the latter being apertured at 24, 24 to reduce weight and to conserve material. Secured to the front side of the web 23 by screws 25, 25 is a dust cover 26 that is of general conoidal shape, said dust cover being formed near its apex with a circumferential cylindrical portion 27 that is concentric with the axis of the wheel, the apex of the dust cover being outwardly convex.

A shoulder 28 is formed at the rear margin of cylindrical portion 27. An ornamental hub cap 29 is permanently attached to the apex of the dust cover, the margin of the hub cap extending to the cylindrical portion 27.

The vehicle wheel includes a tire-supporting rim 30, herein shown as a drop-center rim although any standard rim with removable side flange may be employed, said rim being removably attached to the brake drum 21 by means of an endless driving ring 31. To this end the front face of the brake drum is formed with a relatively narrow, concentric, upstanding rib 32, Figure 2, outside the base of dust cover 26, said rib merging with a plurality of apertured bosses, such as the boss 33, Figure 2, disposed at equally spaced points circumferentially of said rib 32. Extending through apertured bosses 33 are respective retaining bolts 34 that extend through suitable bolt holes in the driving ring and have coned nuts 35 threaded thereon. Preferably said bolt holes in the driving ring are formed with circumferential beads or tapered marginal flanges 36, Figure 2, which fit flush against the conical portion of nuts 35, the arrangement being such that driving torque is transmitted to the bolts 34 through the nuts 35 whereby shearing of the bolts is obviated, and relative angular movement between driving ring and brake drum is prevented.

The driving ring 31 is angular in transverse section, being formed with a circumferential portion or flange 31a that extends laterally and forwardly from its outer periphery, and engages the inner peripheral face of the rim 30 to which it is permanently secured by a plurality of rivets 38, 38, with the result that the driving ring braces and reinforces the rim. The driving ring is formed with elongate arcuate slots 40, 40 for effecting a circulation of air past the driving ring and into contact with the brake mechanism to cool the said brake mechanism.

The feature of mounting the driving ring 31 on the relatively narrow rib 32 on the brake drum restricts the transfer of heat therebetween, so that the rim is not unduly heated by frictional heat generated during braking.

The outer perimeter of the ornamental cover 42 preferably is formed with a flange 52 that is positioned inside the inner perimeter of rim 30, in spaced relation thereto so that the cover is easily mounted not withstanding such slight out of roundness as subsequently occurs in most tire rims. The arrangement also avoids noise and squeaks due to any relative movement of the tire rim and ornamental cover. It is desirable that the cover 42 be so constructed that air can pass therethrough for the purpose of circulating about brake drum 21 to cool the same, and to this end said cover is made in simulation of a spoked wheel, with apertures 53, 53 between the simulated spokes, which apertures have a larger area than the slots 40.

Figure 3:
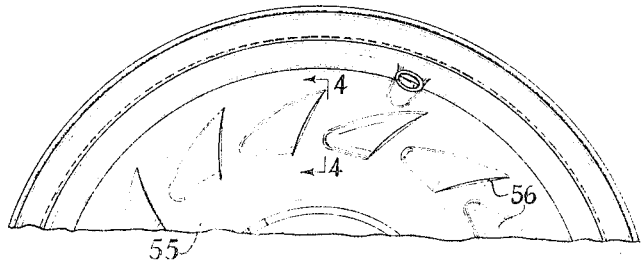
Figure 3 is a fragmentary front elevation of a wheel provided with a modified form of ornamental cover.
Figure 4:
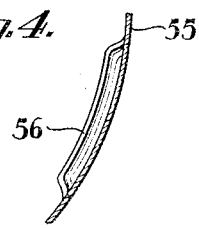
Figure 4 is a section on the line 4—4 of Figure 3.

In the modified embodiment of the invention shown in Figures 3 and 4 the ornamental cover 55 is formed with a circumferential series of louvers 56, 56 that are arcuate in form, affording openings to cause air to pass through said cover in adequate volume to cool the brake drum 21.

The invention provides a vehicle wheel of attractive appearance and efficient operation, which is easily assembled and disassembled, and which achieves the other advantages set out in the foregoing statement of objects.

Other modifications may be resorted to without departing from the spirit of the invention or the scope thereof as defined by the appended claims.

What is claimed is:

1. In a vehicle wheel the combination of an annular brake drum formed on a lateral face with a relatively narrow, concentric rib connecting a series of aperture bosses, a tire rim, and a driving ring secured to the latter and bolted to said brake drum, said driving ring being supported by said brake drum solely through said rib, bosses, and bolts.

2. In a vehicle wheel the combination of a hub, a brake drum carried thereby, a dust cover attached to said brake drum, an ornamental cover carried by said dust cover, a tire rim, an annular ring connecting the rim to the brake drum radially outwardly of said dust cover, said ornamental cover and said ring being formed with respective series of apertures, the apertures of each series being of different area so as to cause air to circulate between the rim and the brake drum when the wheel rotates.

ANDREW S. VAN HALTEREN.